(12) United States Patent
Willerscheid et al.

(10) Patent No.: US 6,687,968 B2
(45) Date of Patent: Feb. 10, 2004

(54) FRICTION GENERATING DEVICE AND METHOD OF MAKING THE SAME

(75) Inventors: Heiner Willerscheid, Sasbach (DE); Karl Wurm, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/174,459

(22) Filed: Jun. 17, 2002

(65) Prior Publication Data

US 2003/0141164 A1 Jul. 31, 2003

Related U.S. Application Data

(63) Continuation of application No. 07/952,568, filed on Sep. 28, 1992.

(30) Foreign Application Priority Data

Sep. 28, 1991 (DE) .................................. P 41 32 421
May 26, 1992 (DE) .................................. P 42 17 358

(51) Int. Cl.[7] .............................................. B23K 26/00
(52) U.S. Cl. ........................ 29/421.1; 83/53; 156/248; 156/272.8; 188/259; 192/107 R; 219/121.18; 228/160

(58) Field of Search .............................. 29/421.1; 83/53, 83/177; 156/247, 248, 272.8; 451/38; 192/107 R; 228/160; 188/259, 77 R, 77 W; 219/121.18

(56) References Cited

U.S. PATENT DOCUMENTS

| | | | |
|---|---|---|---|
| 3,231,058 A | * | 1/1966 | Batchelor et al. ........ 192/107 R |
| 3,526,162 A | * | 9/1970 | Willcox ........................ 83/177 |
| 3,532,014 A | * | 10/1970 | Franz ............................ 83/53 |
| 3,668,028 A | * | 6/1972 | Short ....................... 156/272.8 |
| 3,893,225 A | * | 7/1975 | Hamrick et al. .......... 228/173.6 |
| 4,406,394 A | * | 9/1983 | Nels ............................ 228/170 |
| 5,097,731 A | * | 3/1992 | Vives et al. ................... 83/53 |
| 5,934,435 A | * | 8/1999 | Bauer ....................... 192/107 R |

* cited by examiner

Primary Examiner—Rodney H. Bonck
(74) Attorney, Agent, or Firm—Darby & Darby (57) ABSTRACT

A friction lining for use in the clutch plate of a friction clutch or a multiple wrap brake band for use in an automatic transmission is obtained by adhesively securing one side of a friction generating second layer to one side of a metallic first layer. The necessary incisions in the form of cuts, slots or slits are made from the exposed side of the second layer in a direction toward the exposed side of the first layer by resorting to one or more high-energy streams, such as laser beams, electron beams or liquid jets. Each incision can be made in one or more stages by a single stream or by a series of successively applied streams.

13 Claims, 4 Drawing Sheets

FRICTION GENERATING DEVICE AND METHOD OF MAKING THE SAME

CROSS-REFERENCE TO RELATED APPLICATION

The present application is a continuation of U.S. patent application Ser. No. 07/952,568, filed Sep. 28, 1992, which is hereby incorporated by reference in its entirety.

BACKGROUND OF THE INVENTION

The invention relates to brake bands, friction linings and analogous friction generating devices or bodies which can be utilized in automatic transmissions and/or friction clutches of motor vehicles or for other purposes. The invention also relates to a method of making such friction generating bodies. Friction generating bodies of the above outlined character normally constitute laminates or sandwiches wherein a metallic first layer or substrate carries a second layer consisting at least in part of a friction generating material.

Brake bands wherein a metallic layer carries a layer of friction generating material are disclosed, for example, in the aforementioned commonly owned copending patent application Ser. No. 07/952,582, of Johann Jäckel et al. and in U.S. Pat. No. 4,602,706 granted Jul. 29, 1986 to John C. Blinks et al. for "Double wrap brake band". The disclosures of Jäckel et al. and of the patent to Blinks et al. are incorporated herein by reference.

Friction generating bodies in the form of substantially disc-shaped circular friction clutch linings are disclosed, for example, in the German Auslegeschrift No. 1 210 686. The friction generating layer of the friction lining which is disclosed in this German publication is glued to the metallic layer or substrate. A drawback of the just described friction linings is that, when the friction clutch which embodies the friction lining of the German publication is heated, the thermally induced expansion of the metallic layer departs from the thermally induced expansion of the friction generating layer. The friction lining then acts not unlike a bimetallic element, i.e., the friction lining undergoes undue and highly undesirable deformation. Moreover, the bond between the two layers of such friction lining is subjected to highly pronounced separating stresses.

OBJECTS OF THE INVENTION

An object of the invention is to provide a relatively simple and inexpensive friction generating device or body wherein a metallic layer is affixed to and supports a friction generating layer.

Another object of the invention is to provide a novel and improved brake band for use in automatic transmissions of motor vehicles.

A further object of the invention is to provide a friction lining for use in clutch plates or clutch discs of friction clutches for motor vehicles.

An additional object of the invention is to provide a novel and improved method of making a friction generating device or body of the above outlined character.

Still another object of the invention is to construct and assemble the friction generating body in such a way that the metallic layer is movable to an optimum position relative to the friction generating layer and/or vice versa.

A further object of the invention is to provide a method of assembling a friction generating device or body of the above outlined character in such a way that any weakening of the one and/or the other layer takes place subsequent to affixing of the second layer to the first layer.

Another object of the invention is to provide a novel and improved method of making incisions into the one and/or the other layer of the friction generating body.

An additional object of the invention is to provide a novel and improved method of converting the above outlined friction generating body into a multiple wrap brake band.

Still another object of the invention is to provide a novel and improved method of converting the above outlined friction generating body into a friction lining for use in the clutch plates or clutch discs of friction clutches in motor vehicles.

A further object of the invention is to provide novel and improved means for making incisions in the above outlined friction generating body.

Another object of the invention is to provide novel and improved means for making incisions in the friction generating layer of the above outlined body.

An additional object of the invention is to provide a transmission which embodies one or more friction generating bodies of the above outlined character.

Still another object of the invention is to provide a clutch plate or clutch disc which embodies the above outlined friction generating body.

SUMMARY OF THE INVENTION

One feature of the present invention resides in the provision of a shaped friction generating body which can be used as a brake band (e.g., in automatic transmissions), as a friction lining in the clutch plate or clutch disc of a friction clutch for motor vehicles, or for other purposes. The improved friction generating body comprises a metallic first layer (e.g., a layer of steel) having a first side and a second side, and a second layer which is affixed (e.g., bonded) to one side of the first layer and consists at least in part of a friction generating material (e.g., a material which is used to make brake linings for incorporation into the clutch plates or clutch discs of friction clutches for motor vehicles). In accordance with a feature of the invention, at least one of the two layers has at least one incision or cut resulting from the application of at least one high-energy stream such as a laser beam, an electron beam or a liquid jet.

The layers can together constitute or form part of a friction lining for use in clutch plates or clutch discs. The at least one incision can be provided in and can extend at least substantially through the second layer. The at least one stream for the making of such incision can be a laser beam. The at least one incision can extend substantially radially or substantially chordally of the friction lining, and at least the radial incision can extend at least substantially all the way from the center to the periphery of the friction lining.

The two layers can jointly constitute a substantially cylindrical brake band for use in conjunction with a brake drum or clutch drums. One or more laser beams can be used to provide the cylindrical brake band with one or more incisions.

The second layer has a first side adjacent the one side of the first layer and a second side, and the at least one incision can extend from the second side toward the first side of the second layer (e.g., toward but short of the first side, all the way to the first side, beyond the first side and into the first layer, or all the way to the other side of the first layer).

The first layer can at least partially surround the second layer. For example, if the two layers are hollow cylinders, the hollow cylinder which constitutes the first layer can surround the entire hollow cylinder which constitutes the second layer.

The second layer can include at least one portion of reduced thickness (e.g., zero thickness) as a result of material removal, e.g., by subliming and/or by melting. Such subliming and/or melting can be carried out in an atmosphere of inert gas. Any remnant or remnants of material which has been removed from the second layer (e.g., by subliming and/or by melting) but tends to adhere to the one and/or the other layer can be separated from the layers as a result of entrainment with one or more streams of a gaseous fluid, e.g., air or nitrogen.

The at least one incision can be formed as a result of the application of one or more fluids.

The at least one incision can extend through the second layer and thence from the one side toward the other side of the first layer, e.g., toward but short of the other side or all the way to the other side of the first layer. Such incision can be formed as a result of cutting with a laser beam in the presence of oxygen.

The at least one incision can extend through one of the layers and into the other layer as a result of cutting with one or more high-pressure laser beams.

The at least one stream can be an uninterrupted laser beam or a pulsating laser beam.

Another feature of the invention resides in the provision of a friction lining for use in the clutch plates or clutch discs of friction clutches, particularly in motor vehicles. The friction lining comprises a metallic first layer having a first side and a second side, and a second layer which is affixed (e.g., soldered, brazed, welded or glued) to one side of the first layer and consists at least in part of a friction generating material. At least the second layer has at least one incision which is formed therein as a result of the application of at least one high-energy stream, particularly one or more laser beams.

A further feature of the invention resides in the provision of a substantially cylindrical brake band (e.g., a multiple wrap brake band) which comprises a metallic first layer having a first side and a second side, and a second layer applied (e.g., glued) to one side of the first layer and consisting at least in part of a suitable friction generating material. At least one of the two layers has at least one incision or cut (e.g., in the form of a circumferentially extending slot or slit, a substantially U-shaped slit or cut, or one or more substantially L-shaped cuts or slits) as a result of the application of at least one high-energy stream, for example, one or more laser beams, one or more electron beams or one or more liquid jets.

An additional feature of the invention resides in the provision of a method of making a shaped friction generating body. The improved method comprises the steps of bonding one side of a metallic first layer to one side of a second layer which consists at least in part of a friction generating material, and providing at least one of these layers with at least one incision (e.g., a slit, a slot or a cut) including subjecting the at least one layer to the action of at least one high-energy stream, for example, to the action of one or more laser beams, one or more electron beams or one or more liquid jets.

At least one of the layers can resemble or constitute a disc, and the at least one incision can be provided in the second layer. The at least one stream which is used to make such incision can be a laser beam. The at least one incision can extend at least substantially radially of the disc (e.g., all the way or nearly all the way from the center to the periphery of such disc) or it can extend substantially chordally of the disc.

The method can include the steps of imparting to the layers the shape of hollow cylinders one of which surrounds the other cylinder. The incision or incisions in at least one layer of such hollow cylindrical body is preferably made by resorting to one or more laser beams.

The step of making the at least one incision preferably includes directing the at least one stream against the other (exposed) side of the second layer. If the body is a hollow cylinder, the at least one layer preferably constitutes that cylinder which is surrounded by the other cylinder so that it has an exposed other side which is surrounded by the one side and by the other cylinder. The step of providing at least one incision preferably includes directing one or more streams against the exposed other side of the at least one layer (inner cylinder).

The method can further comprise the step of removing at least one portion of the second layer from the first layer. The removing step can comprise subliming and/or melting the at least one portion of the second layer. Such removing step can be carried out in an inert gas atmosphere. Remnants of the removed portion or portions of the second layer, which often tend to adhere to at least one of the layers can be separated from such layers, e.g., by entraining the remnants with at least one stream of a gaseous fluid such as air or nitrogen.

The step of providing at least one incision can be carried out in the presence of one or more fluids.

The incising step can include directing the at least one stream against the other (exposed) side of the second layer.

It is often preferred to carry out the incising step by resorting to laser beam cutting with oxygen.

Regardless of whether the body is to be provided with one, two or more incisions, the providing step can include simultaneously directing a plurality of laser beams against the other side of the second layer to form a plurality of incisions each of which can extend through the second layer and into the first layer (e.g., toward but short of the other side of the first layer or all the way to the other side of the first layer).

The step of providing at least one incision can include directing against the other side of the at least one layer one or more high pressure laser beams to extend the at least one incision through the at least one layer and into the other layer (e.g., partially through or all the way through the other layer).

The at least one stream can constitute a continuous laser beam or a pulsating laser beam.

The novel features which are considered as characteristic of the invention are set forth in particular in the appended claims. The improved friction generating body itself, however, both as to its construction and the method of making the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
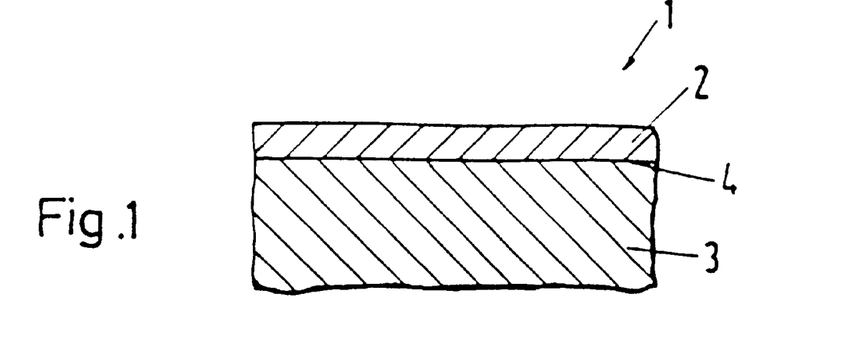
FIG. 1 is a fragmentary sectional view of a friction generating body which is about to be provided with an incision.

FIG. 1 shows a portion of a body or device 1 which can be converted into the friction lining of a clutch plate or clutch disc for use in the friction clutch of a motor vehicle. Reference may be had, for example, to clutch plates of the type described and shown in commonly owned U.S. Pat. Nos. 4,548,309 (Braun) and 4,572,345 (Brietsch) granted Oct. 22, 1985 and Feb. 25, 1986, respectively. The disclosures of these patents are incorporated herein by reference. The body 1 includes a first layer 3 of a metallic material (e.g., steel sheet) and a second layer 2 of a friction generating material. For example, the thickness of the layer 2 can be in the range of 0.1 to 5 mm or even more, and this layer can constitute a compound structure. For example, the layer 2 can include a matrix with or without a phenolic resin and containing fibers and/or one or more friction generating, lubricating and filler materials. The layer 2 can be made entirely of an organic material, entirely of an inorganic material or of a combination of such materials. The first layer 3 can consist of alloyed or non-alloyed metallic material and can have a thickness of 0.1 to 6 mm. The above data pertaining to the thicknesses of the layers 2 and 3 are given only by way of example and are not intended to limit the thickness of the layer 2 and/or 3 to the aforementioned range(s).

The exact mode of applying one side of the layer 2 to the adjacent side of the layer 3 forms no part of the present invention. For example, the layer 2 can be applied to the layer 3 by pressure, by sintering or by resorting to a suitable adhesive (a film of hardened or set adhesive is indicated at 4). The adhesive film 4 can contain or constitute a phenolic resin. Such adhesive can but need not contain a volatile solvent and can be applied in liquefied or pulverulent state. It is also possible to utilize an adhesive foil having a thickness of between 0.01 and 2 mm and to bond such foil to the adjacent sides of the layers 2 and 3 at an appropriate temperature, e.g., in the range between room temperature and 300° C.

Figure 2:
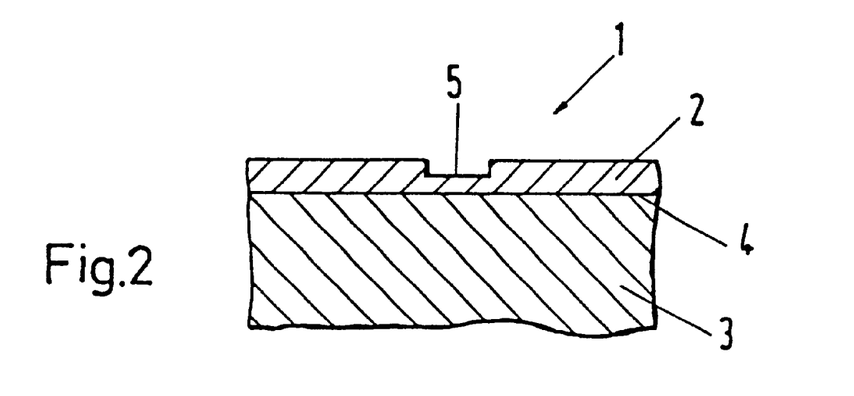
FIG. 2 shows the structure of FIG. 1 and an incision which extends from the exposed side toward but short of the other side of the second layer.

FIG. 2 shows an incision 5 which is provided in the exposed side or surface of the second layer 2 and extends from such exposed side toward but short of the adhesive film 4, i.e., short of those sides or surfaces of the layers 2, 3 which are bonded to each other. The incision 5 of FIG. 2 will be provided if the adhesive film 4 and the layer 3 are to remain intact. The width of the incision 5 can vary within a wide range but preferably exceeds 0.01 mm.

Figure 3:
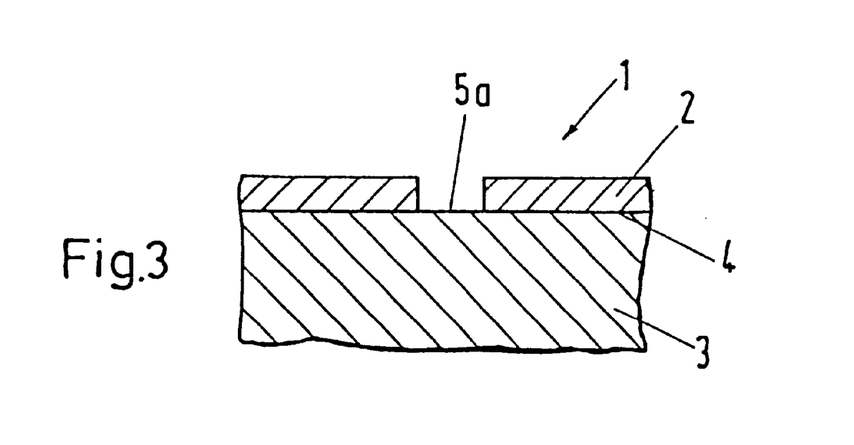
FIG. 3 illustrates the structure of FIG. 3 but with the incision extending through the second layer.

FIG. 3 shows the structure of FIG. 2 but with another incision 5a having a depth such that it extends at least to the adhesive film 4 or through such film to the adjacent concealed side or surface of the metallic layer 3. Thus, the incision 5a can be said to constitute a slit or slot which extends all the way between the two sides or surfaces of the friction generating second layer 2 and may but need not also extend into or through the adjacent portion of the adhesive film 4. It is assumed that the incision 5a extends through the adhesive film 4 so that the adjacent portion of the inner or concealed side or surface of the metallic layer 3 is exposed at the bottom of the incision.

Figure 4:
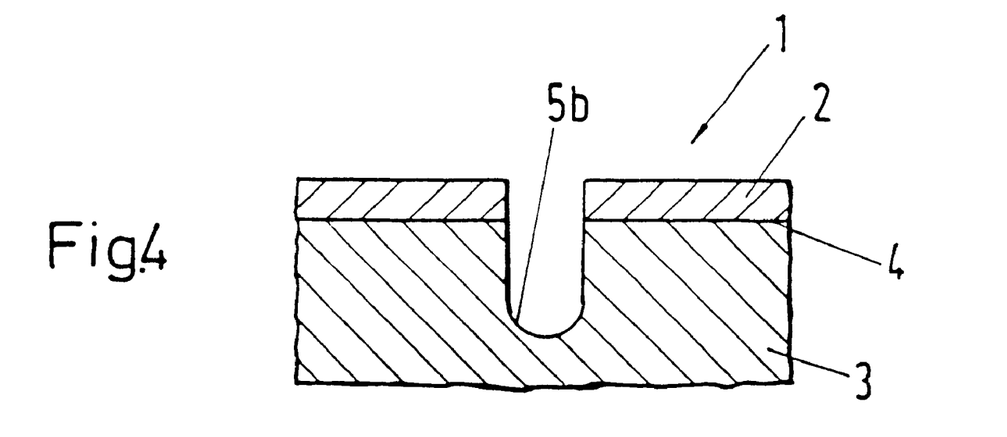
FIG. 4 illustrates the structure of FIG. 3 but with the incision extending into but not through the first layer.

The incision 5b of FIG. 4 extends through the layer 2, through the adhesive film 4 and well into but not entirely through the metallic layer 3. The incision 5, 5a or 5b can be formed as a result of removal of material of the respective layer or layers or as a result of cutting through such layer or layers. As already mentioned above, the width of the incision 5, 5a or 5b can vary within a wide range but is preferably not less than 0.01 mm.

Figure 5:
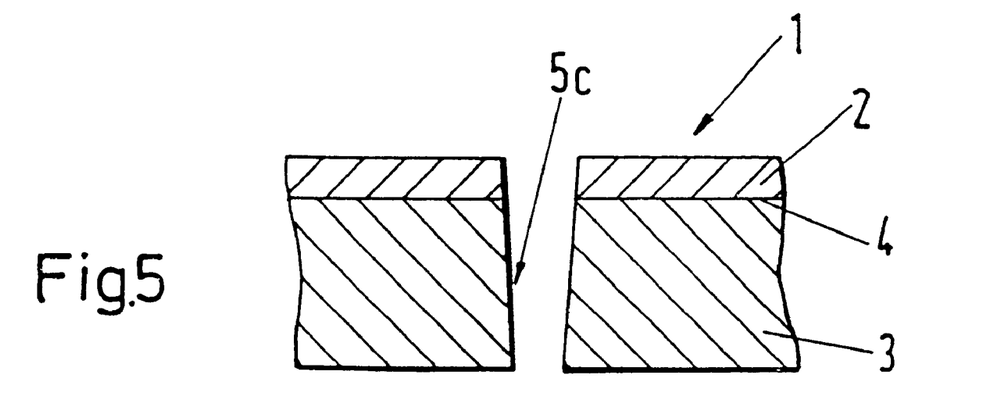
FIG. 5 illustrates the structure of FIGS. 1, 2, 3 or 4 but with the incision extending all the way through both layers.

FIG. 5 shows an incision 5c constituting a slit or slot which extends all the way through the layer 2, through the adhesive film 4 as well as through the entire layer 3. Each of the illustrated incisions can be formed in one or more stages, e.g., by directing against the exposed side of the layer 2 a single high-energy stream, such as a laser beam, or by employing two or more streams which impinge upon the exposed side of the layer 2 one after the other. For example, and assuming that the incision 5a of FIG. 3 is obtained as a result of deepening of the incision 5, a first laser beam can be used to cut the incision 5 and a second laser beam is thereupon directed against the surface at the bottom of the incision 5 to form the incision 5a, i.e., to deepen the incision 5. In fact, even the relatively shallow incision 5 of FIG. 2 can be formed by resorting to two or more discrete laser beams or by directing one and the same laser beam first against the exposed side or surface of the layer 2, thereupon against the surface at the bottom of the thus obtained relatively shallow incision (shallower than the incision 5 of FIG. 2), and so on.

Figure 6A:
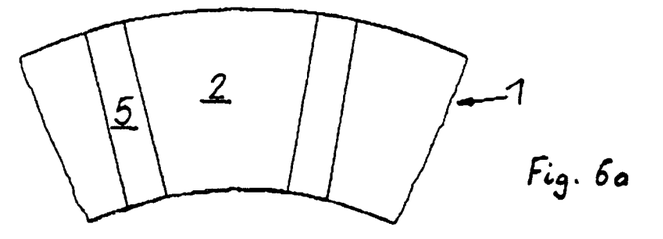
FIGS. 6a to 6e are fragmentary plan views of friction generating bodies which are provided with incisions having different sizes and/or shapes.
Figure 6B:
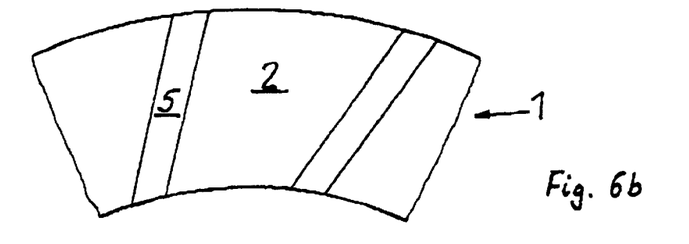
Figure 6C:
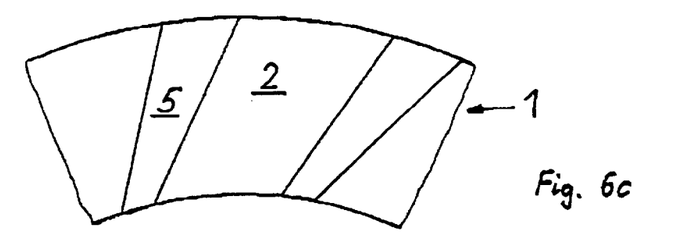
Figure 6D:
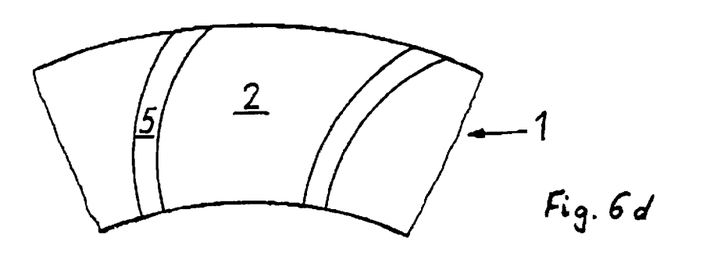
Figure 6E:
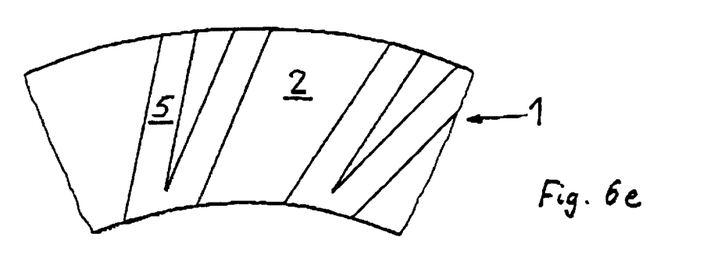

FIGS. 6a to 6e show that the incisions (all denoted by the same reference character 5) can assume different sizes and/or shapes. All of the illustrated incisions are obtained by directing one or more high-energy streams against the exposed side or surface of the second layer 2. The illustrated incisions 5 include straight incisions which can extend radially or chordally of a friction generating body (such as a friction lining for use in the clutch plate or clutch disc of a friction clutch for motor vehicles) as well as arcuate incisions which can extend in the circumferential direction of a disc-shaped or hollow cylindrical friction generating device or body. If a straight incision 5 extends radially or nearly radially of a friction generating body 1, such incision can extend all the way or nearly all the way between the center and the periphery of such body. This is shown in FIG. 6a which is assumed to represent a portion of a body 1 with one or more radially extending incisions 5 (one shown). FIGS. 6c and 6d show that the width of the incision 5 need not be constant (such width can increase, either gradually or non-gradually, in a direction from the center toward the periphery of a friction generating body 1). FIG. 6e shows a substantially V-shaped two-pronged incision 5, and FIG. 6b shows an incision 5 which does not extend substantially radially of a friction generating body 1.

Figure 7:
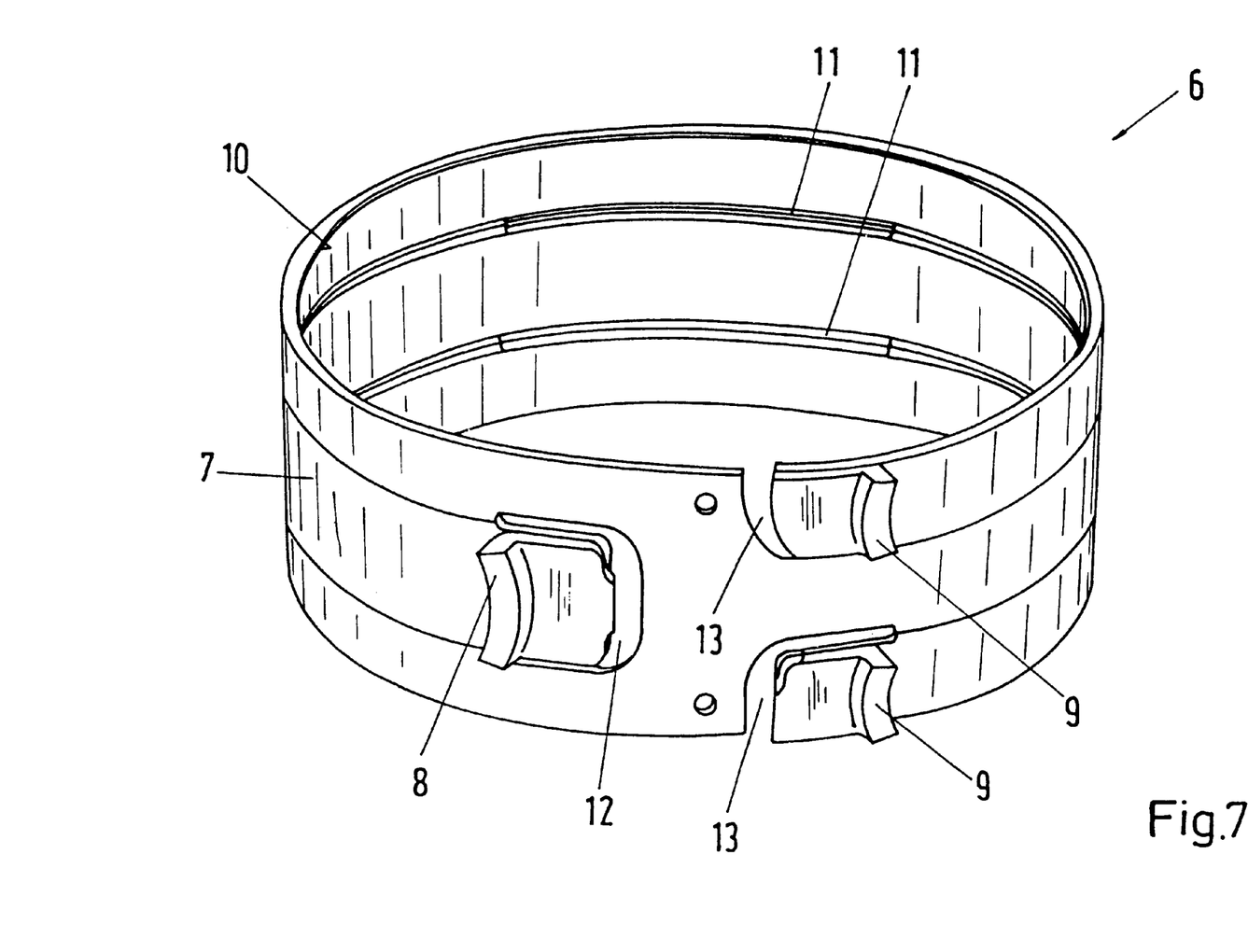
FIG. 7 is a perspective view of a cylindrical brake band with incisions which are formed in accordance with the method of the present invention.

FIG. 7 illustrates a multiple wrap brake band 6 which is a substantially cylindrical friction generating body having a cylindrical outer layer 7 of metallic material and a cylindrical inner layer 10 of friction generating material. The method of making the brake band 6 is or can be the same as disclosed in the aforementioned commonly owned copending patent application of Jäckel et al. The reference character 8 denotes a first discrete actuating element which is bonded to the median wrap of the brake band 6, and the character 9 denotes two additional discrete actuating elements which are bonded to the other wrap of the brake band 6. The purpose of the actuating elements 8 and 9 is disclosed in the aforementioned patent to Blinks et al. to which reference may be had, if necessary. The actuating elements 9 are spaced apart from the actuating element 8 in the circumferential direction of the brake band 6. The reference character 12 denotes a substantially U-shaped incision in the form of a cut or slit which surrounds a tongue carrying the actuating element 8, and the character 13 denotes two L-shaped incisions in the form of cuts or slits defining two axially spaced apart tongues each of which is bonded to one of the actuating elements 9, the same as described and shown in the copending patent application of Jäckel et al. The actuating elements 8 and 9 preferably constitute the arms of an originally one-piece Y-shaped composite actuating element whose arms are bonded (welded or soldered or glued) to the respective tongues before the web between the elements 9 on the one hand and the element 8 on the other hand is removed, e.g., by cutting the composite actuating element with one or more laser beams or in another suitable way.

The second or inner cylindrical layer 10 can be applied to the internal surface of the first or outer cylindrical layer 7 in the same way as described for the layers 2 and 3 of FIGS. 1 to 5, e.g., by pressing, sintering or with an adhesive.

The character 11 denotes in FIG. 7 two circumferentially extending incisions in the form of slits which extend between the centrally located wrap and the two halves of the other or outer wrap of the double wrap brake band 6. One of the incisions or slits 11 extends from one of the two circumferentially extending legs of the U-shaped cut 12 to the circumferentially extending leg of one of the L-shaped cuts 13, and the other incision or slit 11 extends from the other circumferentially extending leg of the cut 12 to the circumferentially extending leg of the other L-shaped cut 13. These incisions 11 are connected to each other by the axially extending leg of the U-shaped cut 12.

The width of the incisions or cuts 12, 13 (or at least the width of certain portions of these cuts) exceeds the width of the circumferentially extending incisions 11 each of which extends through the entire layer 7 as well as through the entire layer 10. This is considered desirable and advantageous in order to permit movements of the actuating element 8 toward or away from the actuating elements 9 (and/or vice versa) so as to enlarge or reduce the diameter of the brake band 6, depending upon whether the band is to frictionally engage or become disengaged from a brake drum or clutch drum, not shown.

The width of the incisions 11 need not be less than the width of certain legs of the cuts 12 and/or 13. For example, the width of the incisions 11 can be increased in the regions adjacent the actuating elements 8 and 9. All of the incisions which are illustrated in FIG. 7 (i.e., those shown at 11, 12 and 13) are preferably made in accordance with the method of the present invention, particularly by resorting to one or more streams of high-energy radiation, such as laser beams, electron beams or liquid jets.

The severing or incising steps are preferably carried out by directing the stream or streams against the exposed internal cylindrical side or surface of the second or inner layer 10. Each such step can involve simultaneous application of two or more streams, or the application of several streams one after the other, or repeated application of one and the same stream. For example one can employ two laser focussing units which are staggered relative to each other in the circumferential direction of the cylindrical body to be converted into the multiple wrap brake band 6 of FIG. 7. The laser beam which is focussed by one of the focussing units can be used to make an incision into or through the inner cylindrical layer 10, and the laser beam which is focussed by the second focussing unit is then used to deepen the incision made by the first laser beam by cutting into and through the cylindrical outer layer 7. Such laser beams can make the incisions 11. A further treatment which can precede or follow the making of incisions 11 is relied upon to make the incisions or cuts 12 and 13. Alternatively, the laser beams which are used to make the incisions can be focussed upon the exposed internal surface of the inner cylindrical layer 10 in such a way that they form the incisions 11 and the incisions or cuts 12, 13 in a single operation. A single high-power laser beam can be used to form the incisions 11 and the cuts or incisions 12, 13.

The high-energy stream or streams can sever or remove the second layer 2. It has been found that the making of incisions with one or more laser beams or with other high-energy streams greatly reduces the likelihood of the development of the aforediscussed bimetallic effect as a result of unequal thermal expansion or contraction of the two layers. This, in turn, reduces the likelihood of the development of pronounced internal stresses and thus prolongs the useful life of the finished friction generating body and reduces the likelihood of undue deformation which could affect the braking action. Unequal thermal expansion is avoided in that at least the second layer is cut so that the two layers can expand or contract independently of each other, depending on their respective thermal expansion coefficients. All that is necessary is to make one or more incisions at least through the entire second layer. The application of contours which bring about the formation of the incisions entails a compensation for different thermal expansion of the layers 2 and 3.

The incisions can serve a purely utilitarian purpose. However, it is equally within the purview of the invention to provide such incisions for utilitarian and/or decorative purposes and/or as advertisements. For example, the incisions can be made to denote the trademark of the manufacturer, the trade name, the name of the manufacturer and/or to convey other information, e.g., in the form of images and/or digits. It is also possible to have one or more portions of an incision extend to a first depth and to have the other portion or portions of the same incision extend to one or more different depths.

An important advantage of relatively narrow incisions is that the major part of the exposed surface of the second layer remains intact and is available to furnish a desirable braking action. At the same time, the width of the incision or incisions (such as those shown at 11, 12 and 13 in the brake band 6 of FIG. 7) will suffice to ensure that certain parts of the finished friction generating body (such as the wraps of the double wrap brake band of FIG. 7) will be free to move relative to each other in order to establish or terminate a braking action. The making of incisions in the layers 7 and 10 which are shown in FIG. 7 takes place subsequent to bonding of the layer 10 to the internal surface of the layer 7; this ensures that the incisions are made at a time when the composite structure including the bonded-together layers 7 and 10 can offer a pronounced resistance to any undesirable deformation.

As already explained hereinabove, it is often preferred to proceed with the making of one or more incisions in a direction from the exposed surface of the second layer (i.e., from the internal surface of the layer 10 in FIG. 7) toward the exposed surface of the first layer. Such mode of making one or more incisions ensures that the high-energy stream or streams do not unduly affect the first layer, especially if the incision or incisions are to be made only in the second layer (as shown in FIGS. 2 and 3).

Removal of the material of the second layer can be effected by burning, melting or subliming. Subliming involves direct transition of the material of the layer from solid state into gaseous state. Removal of the material of the layer preferably takes place in an inert gas atmosphere. It was further found that at least one of the layers can be removed in part in the presence of one or more fluids. Any remnants of removed material of the first and/or second layer can be separated with one or more streams of a gaseous fluid, such as air or nitrogen. Certain other gaseous or liquid remnant removing substances can be utilized with equal or similar advantage. Highly pressurized gases can be used for such purpose. The fluid which is used to remove separated remnants of removed portion or portions of one or both layers can be conveyed coaxially with or at an angle to the direction of the beam or beams which is or are used to form one or more incisions.

Another advantage of making the incision or incisions in such a way that one or more high-energy streams are directed against the exposed surface of the second layer is that, if an incision is to be made through both layers (see FIG. 5), it is much more likely that all remnants of removed portions of the second and first layers will be reliably separated, i.e., such remnants will be prevented from interfering with the braking action of the second layer. Deposits of such remnants along the surfaces bounding one or more incisions could also interfere with movements of neighboring portions of the finished friction generating body relative to each other. For example, deposits of remnants of separated portions of the layers 7, 10 in the brake band of FIG. 7 along the surfaces bounding the incisions 11 could interfere with movements of neighboring wraps of the brake band relative to each other.

If an incision is to be made in each of the two layers, the method can be carried out as follows: The second layer is severed in a first step, and such step can be followed by separation of remnants of the removed portion of the second layer. The separation of remnants is followed by the step of making an incision in the first layer, preferably by resorting to a procedure known as laser beam cutting with oxygen. Addition of oxygen, preferably in the form of an auxiliary gas stream or jet, ensures the development of an exothermic reaction which accelerates the making of incision into the first layer and renders it possible to complete the making of incision within a shorter interval of time. Moreover, the preferably strongly coherent stream or jet of gaseous fluid propels the removed particles from the incision in the direction of gas flow, i.e., out of the cutting or burning zone, and thus prevents the development of bridges of material which was separated from the first layer by the high-energy stream or streams but was permitted to solidify thereafter.

The aforediscussed focussing units for discrete high-energy streams (particularly laser beams) can be moved independently of each other relative to the body which is to be provided with one or more incisions. Alternatively, such focussing units can be installed in a common head which is movable relative to the body to be treated and/or vice versa. Two or more laser beams can issue from a single source or from discrete sources.

For example, the brake band 6 of FIG. 7 can be formed by causing the blank (including the bonded together layers 7 and 10) to complete at least one full revolution around a stationary head which carries one, two or more stream focussing units so that the stream or streams impinge upon the exposed internal surface of the second or inner layer 10. The same result can be achieved if the single head is caused to turn within a stationary blank including the layers 7 and 10. If the head carries two or more focussing units, such units are staggered relative to each other in the circumferential direction of the layer 10 so that the streams impinge upon the internal surface of this layer while being maintained in a predetermined orientation relative to each other. Two or more staggered streams can be used to make one and the same incision or to make discrete incisions. If the two layers are to be severed at the same time, the apparatus which is employed to make such incision or incisions preferably operates with one or more high pressure laser beams. The required pressure is built up with assistance from the process gas and can be in the range of 18–20 bar; however, it is also possible to operate with pressures of 30 or 40 bar.

If the stream or streams are laser beams, the respective laser or lasers can be of the continuously operated type or of the pulsating type.

It is further within the purview of the invention to make the incision or incisions with one or more jets or streams of highly pressurized liquid, e.g., water.

The aforedescribed method and the friction generating body can be modified in a number of additional ways without departing from the spirit of the present invention. For example, the method can be modified by combining the various steps in a different way, by altering the sequence of steps and/or by replacing one or more steps with one or more equivalent or substantially equivalent steps. Furthermore, at least certain combinations of some of the aforediscussed steps are considered to constitute separate inventions of high order. By way of example only, the non-cylindrical blank or the cylindrical blank which is to be converted into a friction lining or into a brake band can be stationary while the means for applying one or more high-energy streams are caused to move relative thereto, or the stream or streams remain stationary while the blank is caused to move relative thereto. Still further, it is possible to merely change the orientation of one or more streams in order to make one or more incisions in a stationary or mobile blank which is to be converted into the improved friction generating body.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A method of making a shaped friction generating body comprising the steps of:
   bonding one side of a metallic first layer to one side of a second layer which is formed at least in part of a friction generating material;
   subjecting at least one of the layers to at least one high-energy stream so as to form at least one incision in and extending at least substantially through the second layer; and
   fabricating the layers as part of a friction lining for use in clutch plates and the at least one incision extends substantially radially of the friction lining, the lining having a central axis of rotation and the peripheral surface, the at least one incision extending at least substantially all the way between the axis and the peripheral surface.

2. The method of claim 1, wherein the step of subjecting the at least one layer to the at least one high-energy stream comprises the step of
   subject the at least one layer to a laser beam.

3. The method of claim 2, wherein the step of subjecting the at least one layer to a laser beam includes the step of: pulsating the laser beam.

4. The method of claim 1, wherein the step of forming the at least one incision comprises the step of:
   subjecting the at least one layer to a liquid media.

5. The method of claim 1, wherein forming the at least one incision comprises the step of cutting through one of the layers with at least one high pressure laser beam such that the at least one incision extends through the second layer and into the first layer.

6. The method of claim 1, further including the step of:
   removing material from the second layer by melting to form at least one portion of reduced thickness.

7. The method of claim 6, further including the step of:
   carrying out the removal of the material in an inert gas atmosphere.

8. The method of claim 6, wherein the layers are at least substantially devoid of removed material of the second layer as a result of entrainment of removed material by one or more streams of gaseous fluid, wherein the one or more gaseous streams comprises at least one of air and nitrogen.

9. A method of making a shaped friction generating body comprising the steps of:
   bonding one side of a metallic first layer to one side of a second layer which is formed at least in part of a friction generating material;
   subjecting at least one of the layers to at least one high-energy stream so as to form at least one incision in one of the layers; and
   forming a substantially cylindrical brake band from the bonded layers.

10. The method of claim 9, wherein subjecting the at least one layer to the at least one energy stream comprises the step of:
    subjecting the at least one layer to a laser beam.

11. A method of making a shaped friction generating body comprising the steps of:
    bonding one side of a metallic first layer to one side of a second layer which is formed at least in part of a friction generating material;
    subjecting at least one of the layers to at least one high-energy stream; and
    removing material from the second layer by subliming to form at least one portion of reduced thickness, wherein the material removal is carried out in an inert gas atmosphere.

12. A method of making a shaped friction generating body comprising the steps of:
    bonding one side of a metallic first layer to one side of a second layer which is formed at least in part of a friction generating material;
    subjecting at least one of the layers to at least one high-energy stream;
    forming a plurality of incisions in the layers, each extending through the entire second layer and into the first layer; and
    forming said incisions simultaneously by a plurality of laser beams.

13. A method of making a shaped friction generating body comprising the steps of:

bonding one side of a metallic first layer to one side of a second layer which is formed at least in part of a friction generating material;

subjecting at least one of the layers to at least one high-energy stream so as to form at least one incision in and extending at least substantially through the second layer; and fabricating said layers as part of a friction lining for use in clutch plates and the at least one incision extends substantially chordally of the substantially circular friction lining, the lining having a central axis of rotation and a peripheral surface and the at least one incision extending at least substantially all the way between the axis and the peripheral surface.

* * * * *